United States Patent
Kim et al.

[11] Patent Number: 5,933,403
[45] Date of Patent: Aug. 3, 1999

[54] DISK PLAYER HAVING A MAGAZINE FOR ACCOMMODATING A PLURALITY OF DISKS

[75] Inventors: Go-hyun Kim; Won-youl Bae, both of Suwon, Rep. of Korea

[73] Assignee: Samsung Electronics Co., Ltd., Kyungki-do, Rep. of Korea

[21] Appl. No.: 08/961,890

[22] Filed: Oct. 31, 1997

[30] Foreign Application Priority Data

Oct. 31, 1996 [KR] Rep. of Korea .................. 96-51422

[51] Int. Cl.$^6$ .................................................. G11B 17/22
[52] U.S. Cl. .............................. 369/191; 369/36; 369/178
[58] Field of Search ............................... 369/36, 178, 191

[56] References Cited

U.S. PATENT DOCUMENTS

| | | | |
|---|---|---|---|
| 5,418,664 | 5/1995 | Ostwald | 360/92 |
| 5,574,705 | 11/1996 | Suzuki | 369/36 |
| 5,703,866 | 12/1997 | Hayashi et al. | 369/192 |
| 5,748,606 | 5/1998 | Nakagawa et al. | 369/271 |
| 5,844,880 | 12/1998 | Motoki et al. | 369/191 |

*Primary Examiner*—William J. Klimowicz
*Attorney, Agent, or Firm*—Sughrue, Mion, Zinn, Macpeak & Seas, PLLC

[57] ABSTRACT

A disk player includes a frame constituting a main body of the disk player, and a magazine for stacking a plurality of trays, each tray holding a disk thereon, and which can be inserted into and ejected from the frame. A chuck is mounted to the frame, for pressing the upper surface of a selected disk drawn out from the magazine. A turntable is mounted to the frame enabling up and down movement, together with the chuck for chucking the drawn-out disk when ascending. An extractor is mounted to the frame enabling forward, backward, upward and downward movement with respect to the magazine, for selectively combining with a selected tray among the plurality of trays in the magazine and drawing out the selected tray between the turntable and the chuck. An elevating mechanism is provided for elevating the extractor, and a loading motor is installed on the frame. A disk loading mechanism, which operates by receiving power from the loading motor, is provided for advancing or retreating the extractor and lifting or lowering the turntable to chuck the selected disk drawn out between the turntable and the chuck.

13 Claims, 19 Drawing Sheets

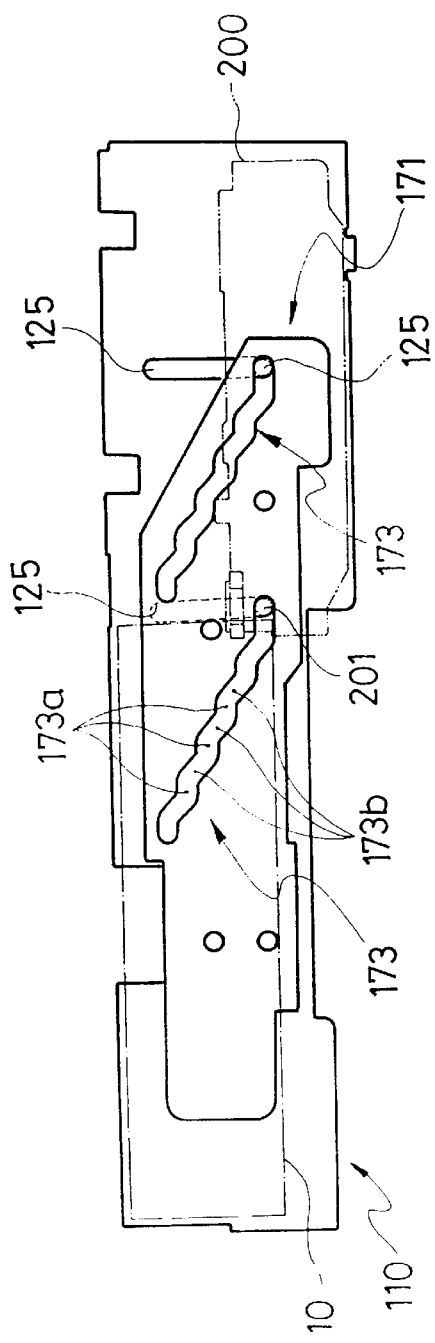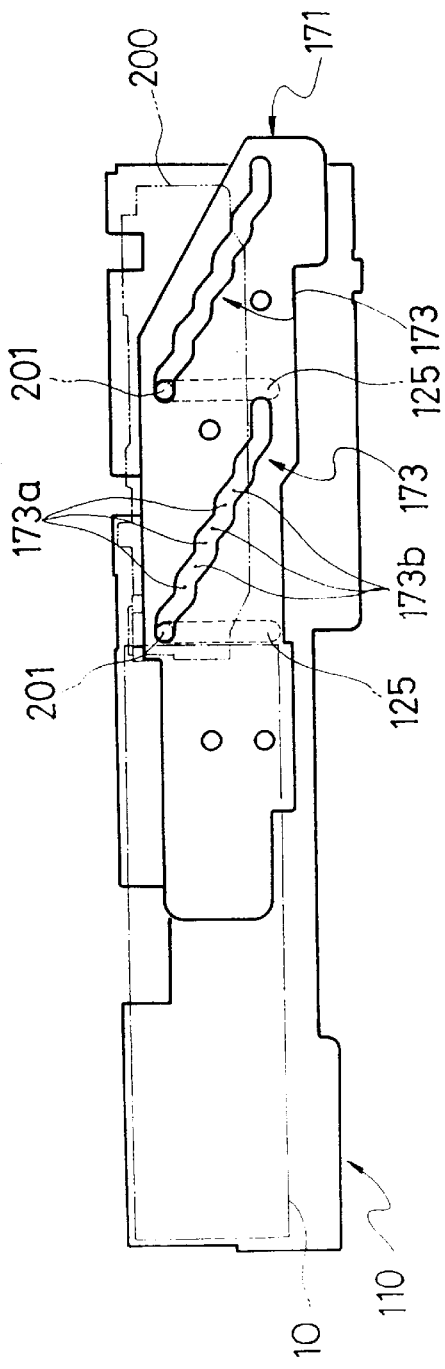

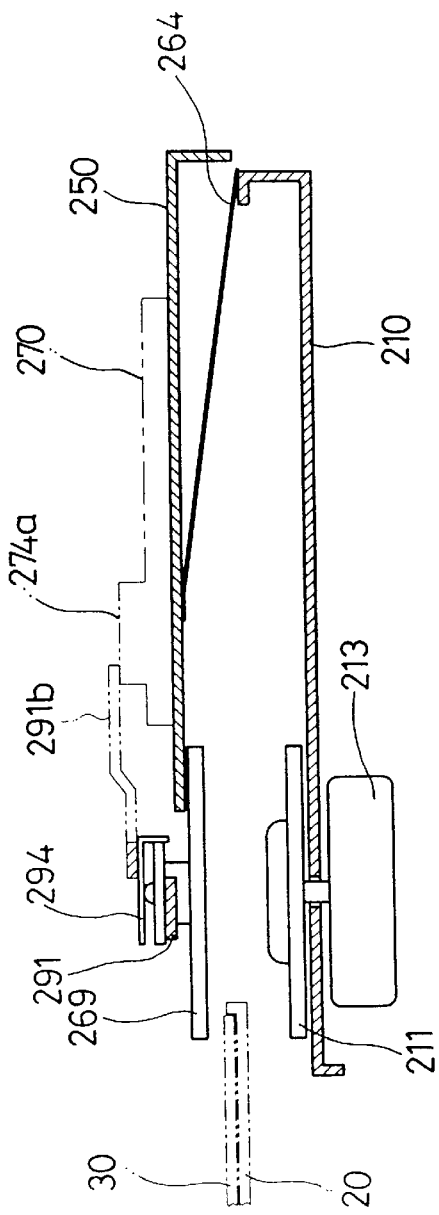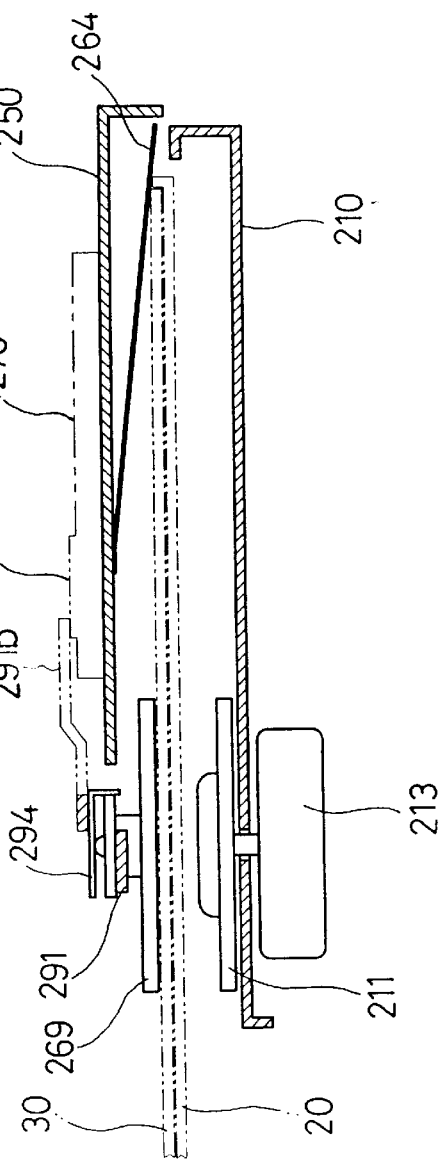

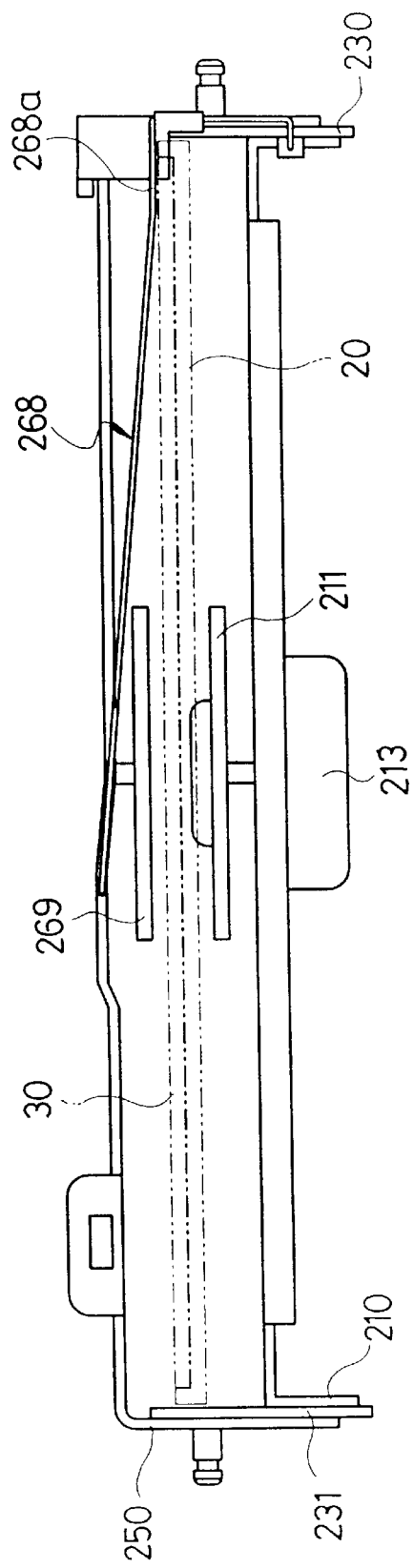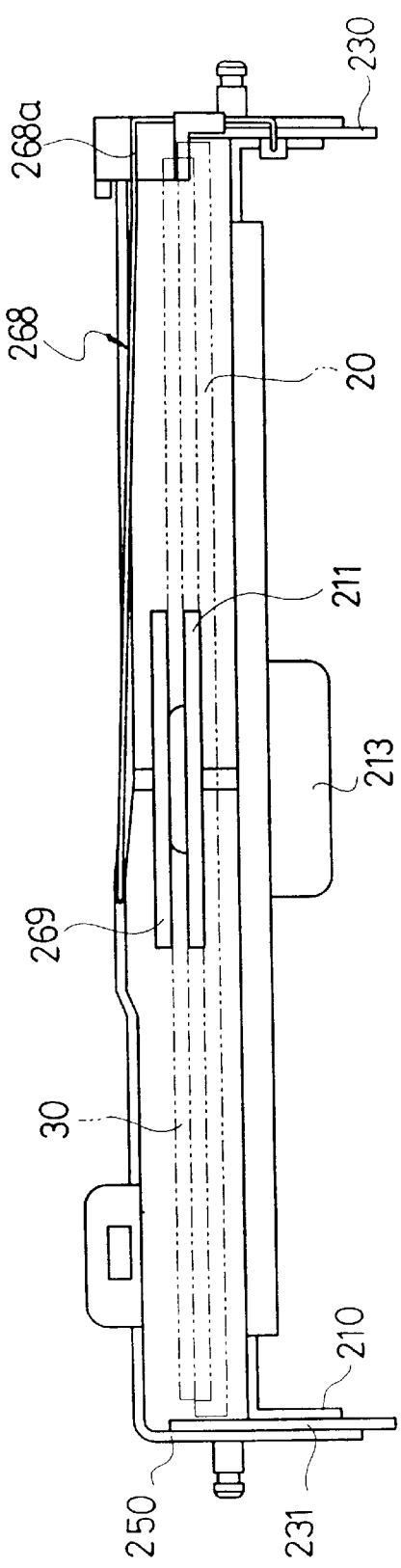

DISK PLAYER HAVING A MAGAZINE FOR ACCOMMODATING A PLURALITY OF DISKS

BACKGROUND OF THE INVENTION

1. Field of the Invention

The present invention relates to a disk player and, more particularly, to a disk player having a magazine for accommodating a plurality of disks.

2. Description of Related Art

A magazine-type disk player, including a magazine for storing a plurality of disks to be stacked, includes a reproduction unit for reproducing information recorded on a disk, a disk drawing-out unit for drawing out a disk from the magazine toward the reproduction unit, a chucking unit for chucking the drawn disk, and an elevating unit for elevating the disk drawing-out unit and the chucking unit.

In the above-structured disk player, the disk drawing-out unit is elevated to a predetermined height, at which a selected disk can be drawn out, by the elevating unit, and then draws out the selected disk from the magazine. The drawn-out disk is reproduced by the reproduction unit. When the reproduction is completed, the drawn-out disk is inserted back into the magazine by the disk drawing-out unit. Therefore, it takes a relatively short time to exchange disks and reproduce the disks, and there is no need to put a new disk in the disk player to reproduce a different disk.

However, in a conventional magazine-type disk player, since the disk drawing-out unit and the chucking unit are operated by separate driving sources, the entire structure of the disk player is complicated and the manufacturing costs are high.

SUMMARY OF THE INVENTION

To solve the above problems, it is an object of the present invention to provide a disk player having an improved structure for drawing out a disk from a magazine and chucking the drawn-out disk.

To accomplish the above object, there is provided a disk player comprising: a frame constituting a main body of the disk player; a magazine for stacking a plurality of trays, each tray holding a disk thereon, and which is operative to be inserted into and ejected from the frame; a chuck mounted to the frame, for pressing an upper surface of a selected disk drawn out from the magazine; a turntable mounted to the frame and enabling up and down movement, together with the chuck for chucking the selected disk, which is drawn out, when ascending; an extractor mounted to the frame and enabling forward, backward, upward and downward movement with respect to the magazine, for selectively combining with a selected tray among the plurality of trays in the magazine and drawing out the selected tray between the turntable and the chuck; an elevating mechanism which elevates the extractor; a loading motor installed on the frame; and a disk loading mechanism which operates by receiving power from the loading motor and which advances or retreats the extractor and lifts or lowers the turntable to chuck the selected disk drawn out between the turntable and the chuck.

The elevating mechanism comprises: an elevating motor installed on the frame; an elevator, which supports the extractor, mounted to the frame and enabling lifting or lowering, and having ends on which combining protrusions are formed; and a pair of sliding members which are installed on respective sides of the elevator enabling sliding in opposite directions to each other by the elevating motor, and which have cam slots with a plurality of horizontal portions formed at different heights and sloped portions formed between the horizontal portions, the combining protrusions respectively combining with the cam slots.

The disk loading mechanism comprises: a pair of sliders slidably installed on respective sides of said elevator; a slider link, which is rotatably installed on the elevator and has ends hingedly combined with the sliders, respectively, for sliding the sliders in opposite directions by a rotation of the slider link; a drawing-out link rotatably installed on the elevator, for combining with the extractor and advancing and retreating the extractor with respect to the magazine by a rotation of the drawing-out link; a deck on which the turntable is installed, ascending and descending with respect to the elevator in engagement with the sliders; and a rotating member installed on the elevator and enabling rotation by the loading motor, for sequentially rotating the drawing-out link and the slider link.

The rotating member has first and second protrusions, a link slot with which the first protrusion is combined is formed in the drawing link, and a rotation slot with which the second protrusion is combined is formed in the slider link.

A chuck elevating mechanism is provided and comprises: a pivoting plate having one end supporting the chuck and the other end hingedly combined with the elevator; a spring for elastically biasing the pivoting plate so that the chuck can press down on the selected disk which is drawn out; and a plurality of planes formed at different heights on the upper surface of the rotating member enabling contact with the pivoting plate.

It is preferable that the disk player further comprises a disk departure preventing mechanism which prevents the disk seated on the drawn tray from leaving its position.

BRIEF DESCRIPTION OF THE DRAWINGS

The above objects and advantages of the present invention will become more apparent by describing in detail a preferred embodiment thereof with reference to the accompanying drawings, in which:

FIGS. 12 and 13 are side views of FIG. 7 viewed from the perspective of "K";

FIGS. 18 and 19 are sectional views taken along line VIII—VIII of FIG. 15;

FIGS. 20 and 21 are front views of FIG. 7 viewed from the perspective of "J"

DETAILED DESCRIPTION OF THE INVENTION

Figure 1:
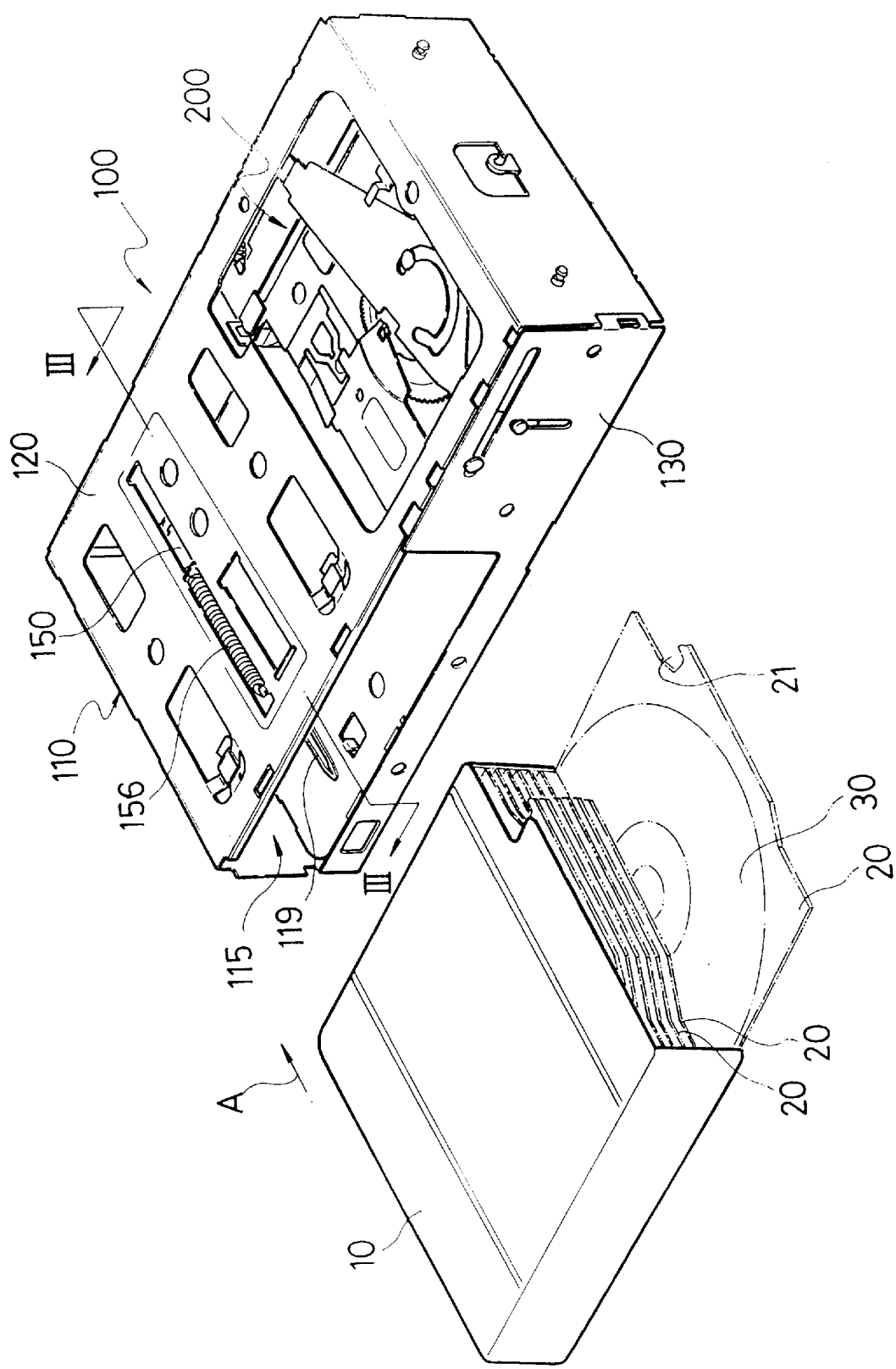
FIG. 1 is a perspective view of a disk player according to a preferred embodiment of the present invention.

Referring to FIG. 1, a disk player according to an embodiment of the present invention includes a magazine 10 and a disk player main body 100. A plurality of trays 20 each for seating a disk 30 thereon are stacked in the magazine 10.

Figure 2:
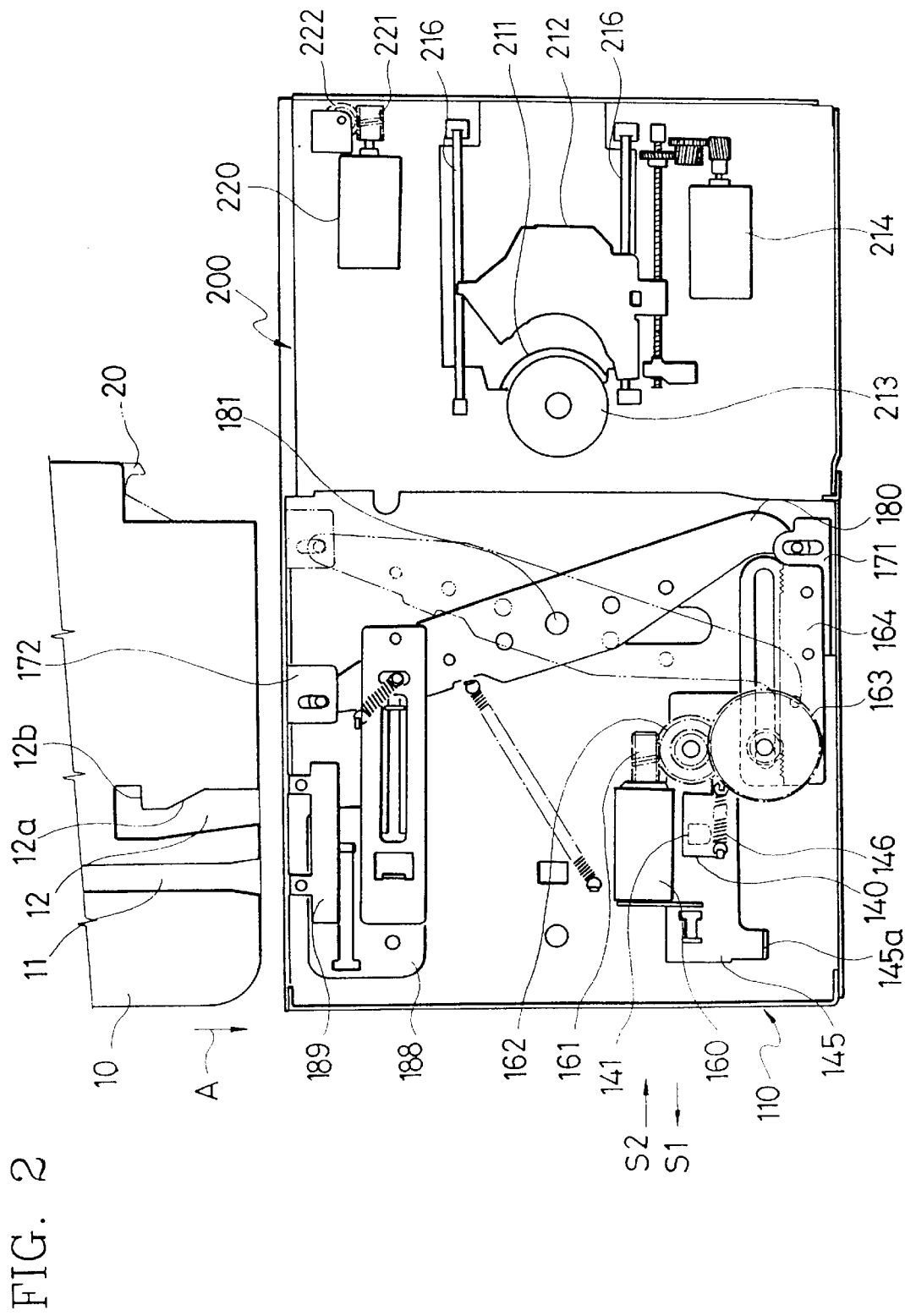
FIG. 2 is a bottom view of the disk player shown in FIG. 1.

The disk player main body 100 is comprised of a frame 110 and a deck assembly 200. The frame 110 includes a casing 120 having an open front surface, and a cover 130 combined with the front surface of the casing 120 to form a magazine inserting hole 115. The magazine 10 is inserted into the frame 110 through the magazine inserting hole 115 in the direction indicated by arrow A. A guide rail 119 is formed inside the frame 110 to guide the insertion of the magazine 10. As shown in FIG. 2, a guide groove 11 is formed on the bottom surface of the magazine 10 so that the guide rail 119 can slide therethrough.

Also, in order to keep the magazine 10 in place inside the frame 110, a locking groove 12 is formed on the bottom surface of the magazine 10 and a stopper 140 to fit into the locking groove 12 is provided in the frame 110. The locking groove 12 includes a slanted portion 12a slanted with respect to the magazine inserting direction (A) and a recessed portion 12b. The stopper 140 is fixed to a reciprocating member 145, and includes a locking protrusion 141 extending to the inside of the frame 110. The reciprocating member 145 is installed in the frame 110 enabling reciprocation perpendicular to the insertion direction (A) of the magazine 10, and elastically biased in the direction indicated by an arrow S2 by a spring 146 whose ends are connected to the frame 110 and the stopper 140, respectively.

Figure 3:
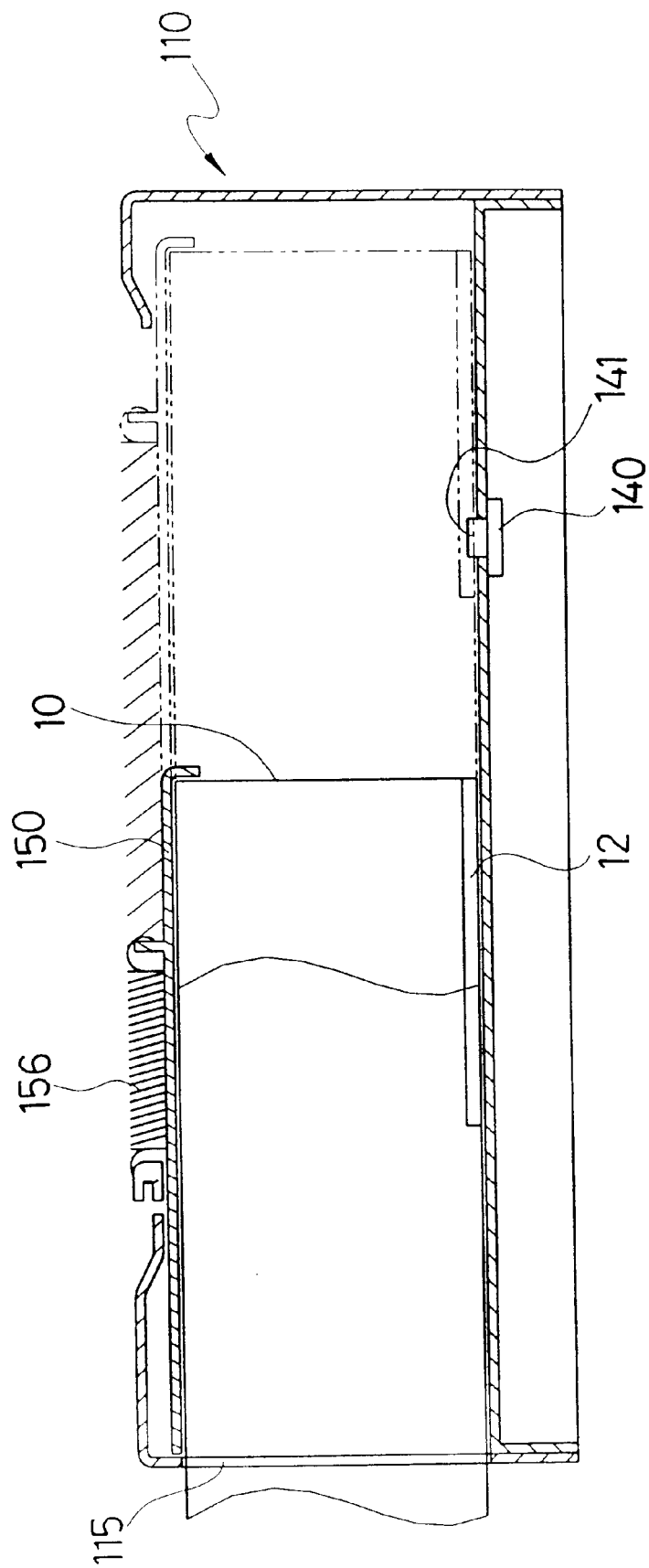
FIG. 3 is a sectional view taken along line III—III of FIG. 1.

As shown in FIGS. 1 and 3, an ejector 150 is installed on the frame 110 enabling reciprocation in the insertion direction (A) of the magazine 10 and in a direction opposite thereto.

Figure 4:
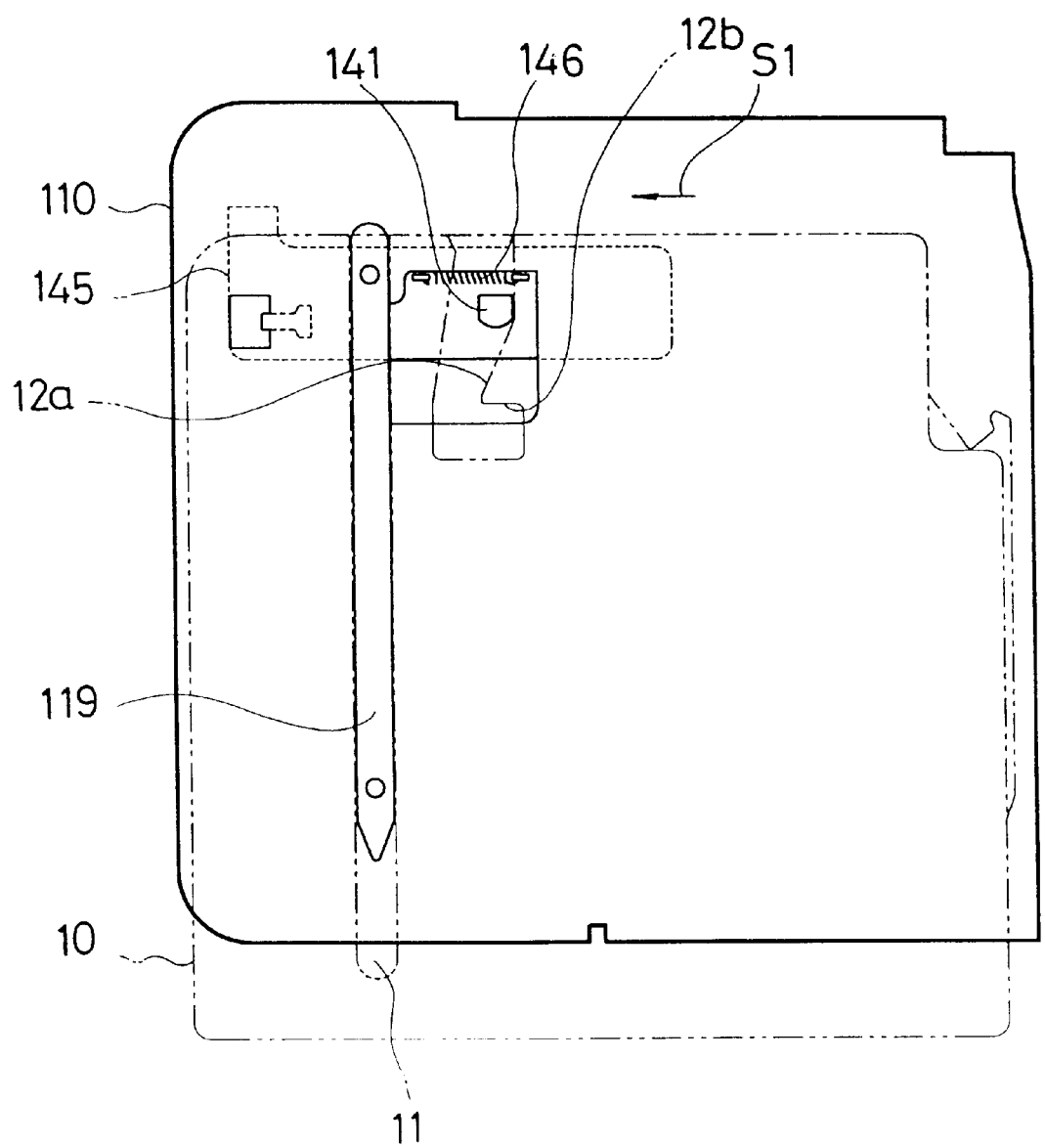
FIGS. 4 through 6 are views for explaining a process for placing a magazine into a main body of the disk player of FIG. 1.

The operation of loading of the magazine 10 into the frame 110 according to the above configuration will now be described. The magazine 10 (see FIG. 1) is inserted into the frame 110 in the direction indicated by arrow A via the magazine inserting hole 115. At this time, as shown in FIG. 4, the insertion of the magazine 10 is guided by the guide rail 119 which fits into the guide groove 11. The locking protrusion 141 of the stopper 140 contacts the slanted portion 12a of the locking groove 12 on the magazine 10. Simultaneously, the leading edge of the magazine 10 being inserted contacts the ejector 150 (see FIG. 3) and pushes the ejector 150 rearwardly.

Figure 5:
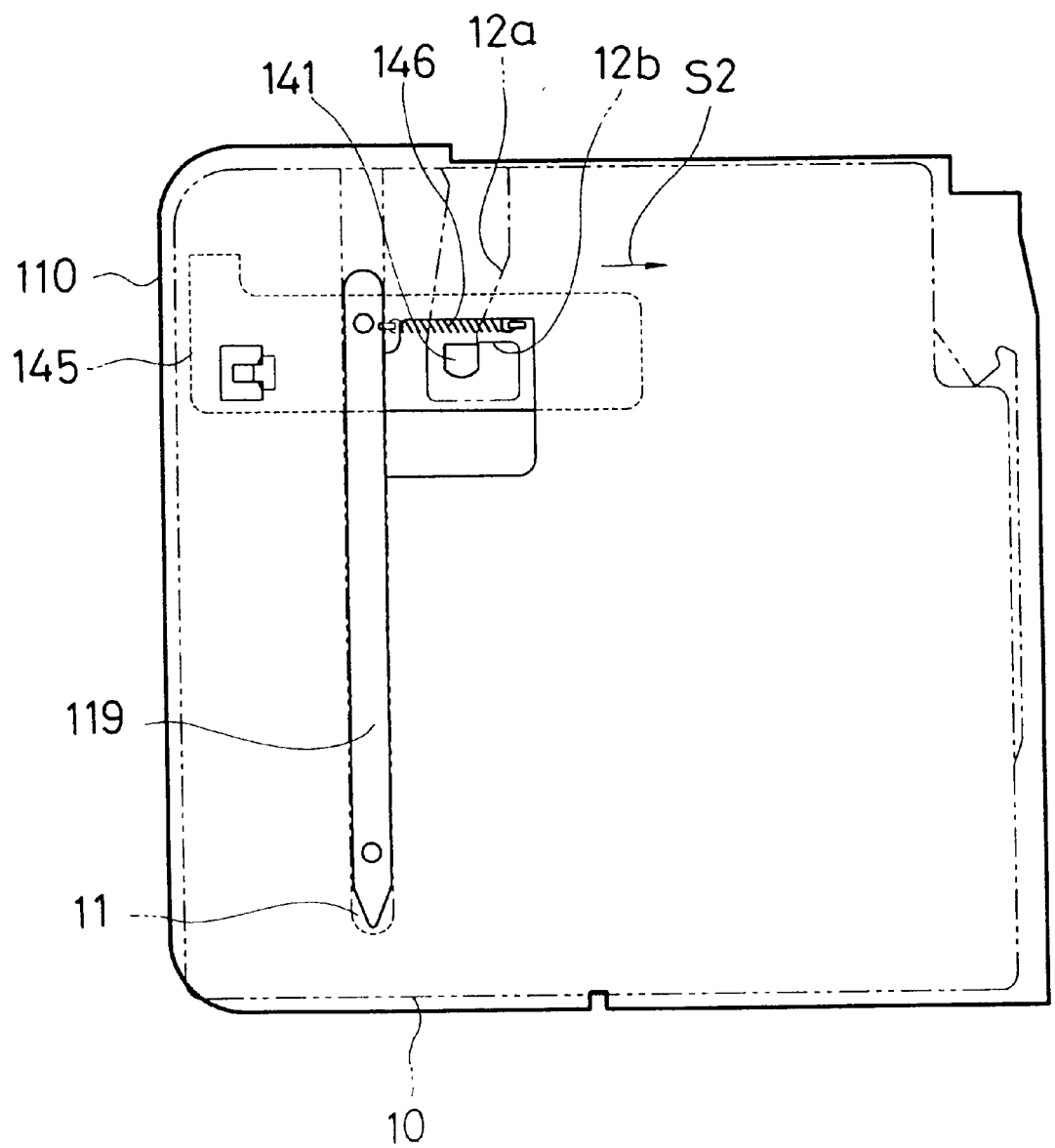
Figure 6:
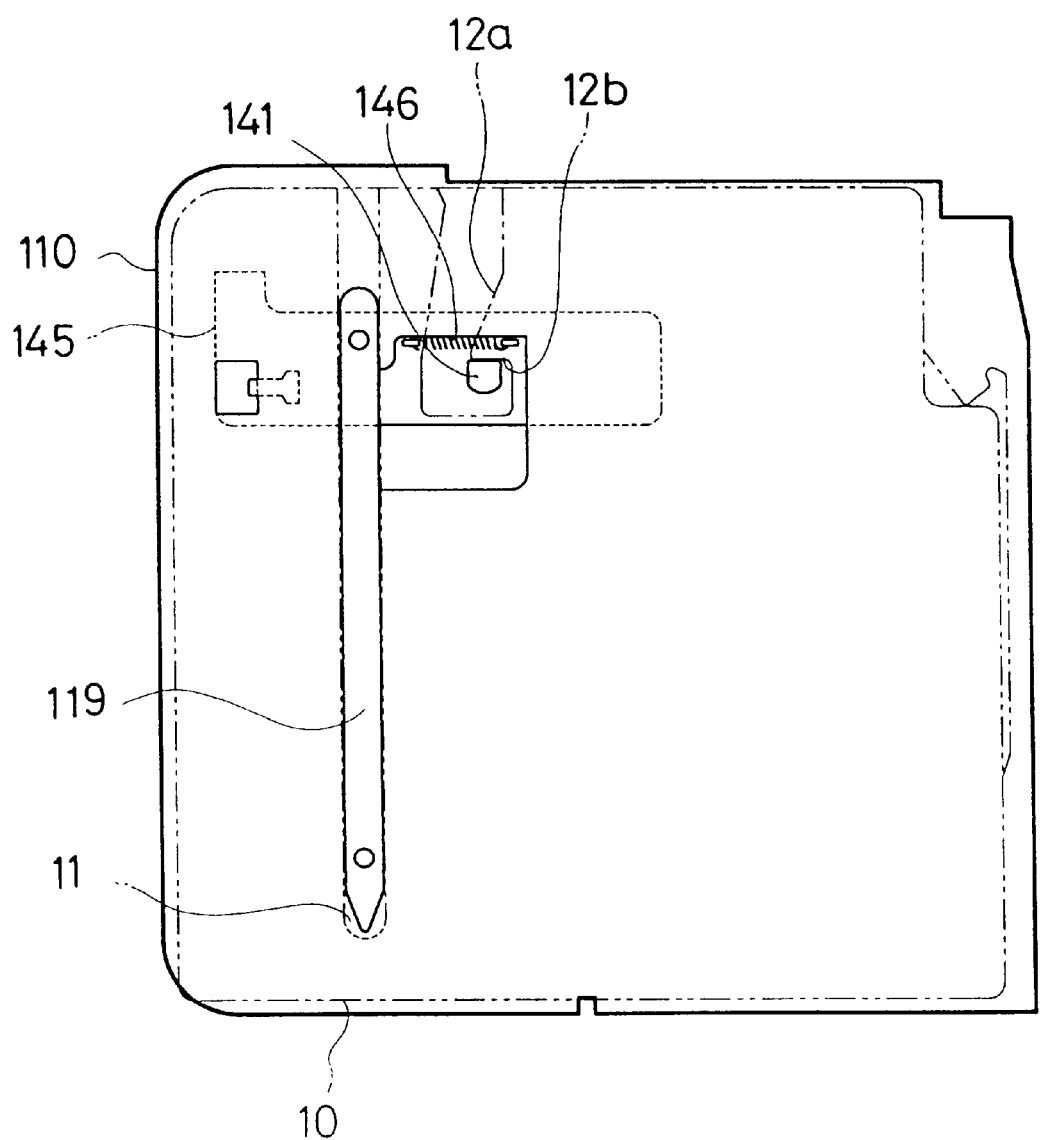

As the magazine 10 is inserted deeper, the locking protrusion 141 slides along the slanted portion 12a. Accordingly, the reciprocating member 145 is moved in the direction indicated by arrow S1 and reaches the state shown in FIG. 5. At this stage, if the magazine 10 is inserted slightly deeper, the locking protrusion 141 passes through the slanted portion 12 and is pushed back to the recessed portion 12b by the restoring force of the spring 146, thereby completing the loading of the magazine 10.

Meanwhile, in order to eject the magazine 10 out of the frame 110, an elevating motor 160 (see FIG. 2) moves a rack member 164 in the direction indicated by arrow S1 to push a hanging protrusion 145a of the reciprocating member 145, thereby moving the reciprocating member 145 in the same direction.

Accordingly, the locking protrusion 141 slips out of the recessed portion 12b of the magazine 10 to be released from the locked state. The magazine 10 is ejected from the frame 110 by the ejector 150 (see FIG. 3) by the restoring force of the spring 156.

When the magazine 10 is loaded in the frame 110, the disks in the magazine 10 are selected by the deck assembly 200, and then information on the selected disk is reproduced. Hereinafter, the configurations of the deck assembly 200 and its driving mechanism will be described.

As shown in FIG. 2, a pair of sliding members 171 and 172 capable of sliding are installed on respective side surfaces of the frame 110. Also, a sliding lever 180 is installed on the frame 110 to be able to pivot around a hinge shaft 181. The ends of the sliding lever 180 are hinged to the sliding members 171 and 172, respectively. The sliding member 171 combines with a rack member 164. The rack member 164 receives the power of the elevating motor 160 via a worm 161, a worm gear 162 meshed with the worm 161, and a pinion 163 meshed with the worm gear 162, so that the rack member 164 can reciprocate in the directions indicated by the arrows S1 and S2.

A sensor dog 188 is installed on the frame 110 enabling reciprocation in the sliding direction of the sliding members 171 and 172. The sensor dog 188 reciprocates in engagement with one end of the sliding lever 180. Also, a sensor 189 for determining the rotational position of the sliding lever 180 by detecting the position of the sensor dog 188 is installed on the frame 110.

Figure 7:
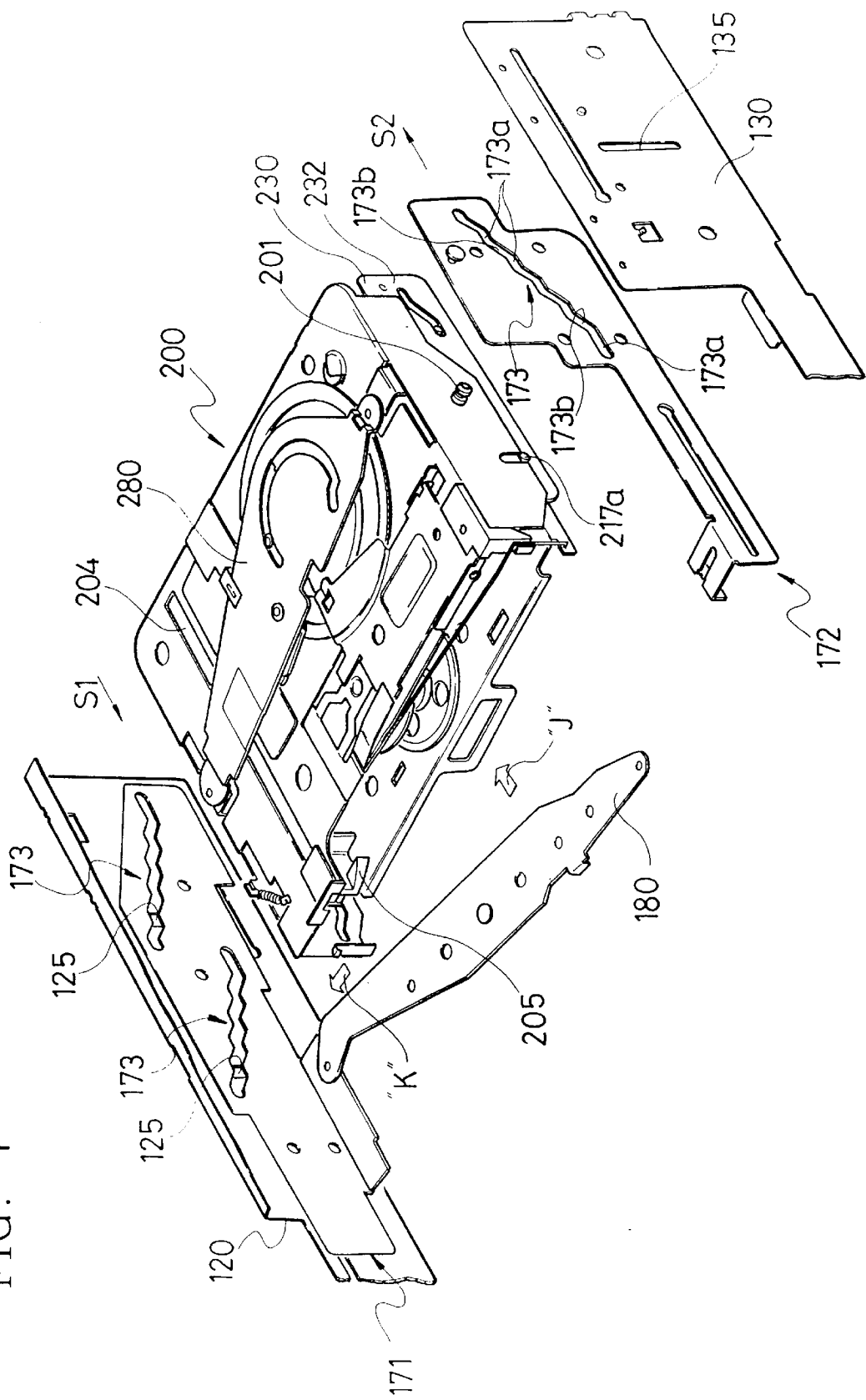
FIG. 7 is an exploded perspective view of essential parts constituting the disk player of FIG. 1.

Referring to FIG. 7, tiered cam slots 173 are formed on each of the sliding members 171 and 172. Each cam slot 173 has horizontal portions 173a and sloped portions 173b formed between the horizontal portions 173a. The number of horizontal portions 173a corresponds to the number of trays 20 in the magazine 10 (see FIG. 1). The height between the horizontal portions 173a is the same as the interval between the trays 20 in the magazine 10.

Figure 8:
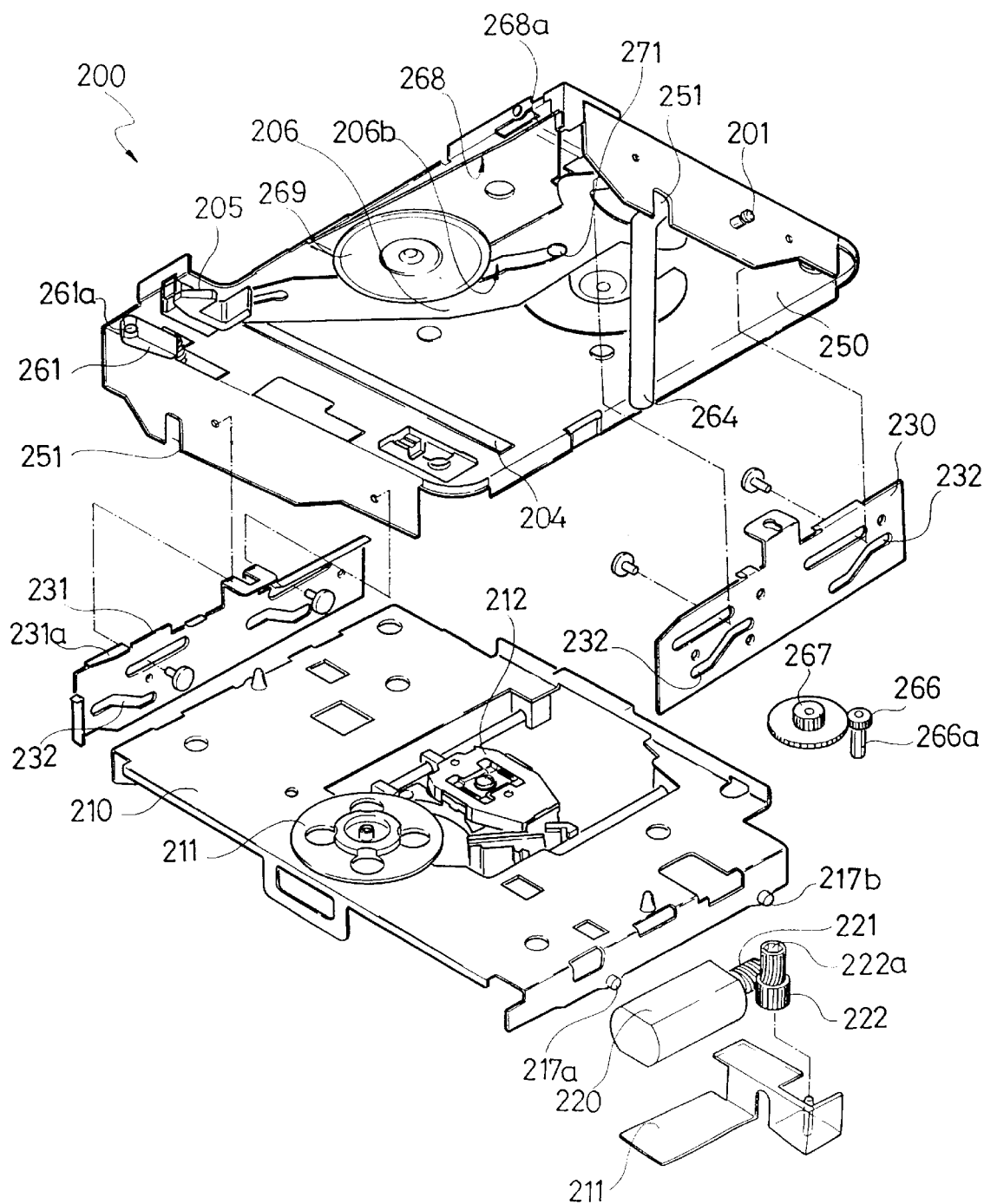
FIG. 8 is an exploded perspective view of a deck assembly shown in FIG. 7.

As shown in FIGS. 7 and 8, the deck assembly 200 is comprised of a deck 210 and an elevator 250 which is installed over the deck 210. A pair of sliders 230 and 231 having slanted slots 232 with slanted middle portions are installed on respective side surfaces of the elevator 250. Combining pins 217a and 217b to combine with the slanted slots 232 are formed on either side surface of the deck 210. The combining pin 217a passes through the slanted slot 232 and fits into a combining groove 251 vertically formed in the elevator 250.

Combining protrusions 201 formed on the side surfaces of the elevator 250 of the deck assembly 200 pass through the cam slots 173 of the sliding members 171 and 172, and combine with vertical slots 125 and 135 formed in the casing 120 and the cover 130. The inclination of the cam slot 173 formed in the sliding member 171 is opposite to that of the cam slot 173 formed in the sliding member 172. Thus, as will be described later, as the sliding members 171 and 172 move in opposite directions, the deck assembly 200 moves up or down.

A loading motor 220 is fixed to the deck 210 by a fixing member 211. A worm 221 meshed with a worm gear 222 is coupled to the output shaft of the loading motor 220. A splined socket 222a is formed in an axial direction on the worm gear 222.

Figure 9:
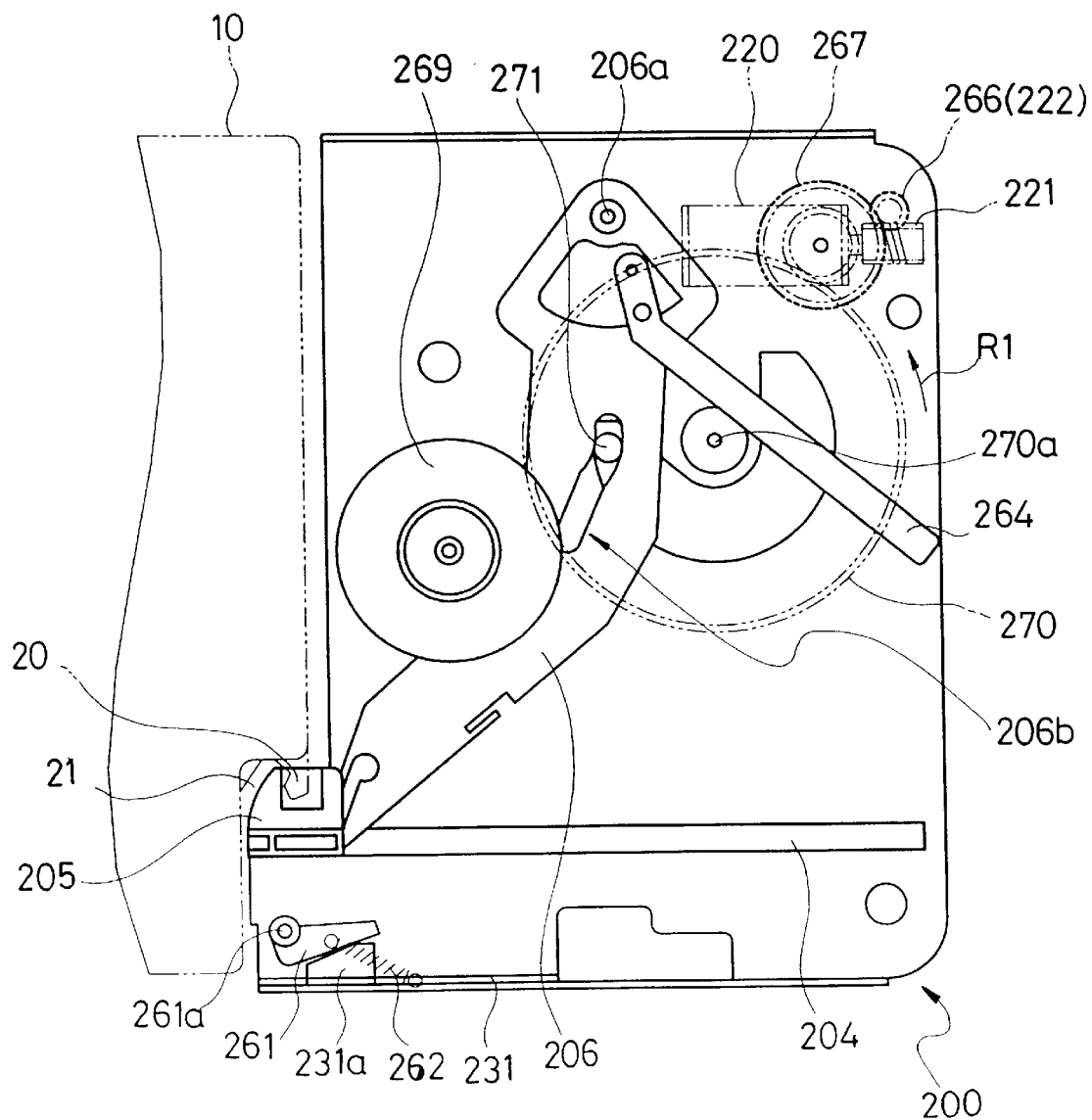
FIGS. 9 through 11 are bottom views of an elevator shown in FIG. 8 for illustrating the operations of a drawing-out link and an extracting unit.

As shown in FIGS. 8 and 9, a drawing-out link 206 is installed on the bottom surface of the elevator 250 enabling pivoting around a hinge shaft 206a. An extractor 205 is connected to the free end of the drawing-out link 206. The extractor 205 moves along a slot 204 to withdraw a tray 20 from the magazine 10.

When the combining protrusion 201 of the deck assembly 200, as shown in FIG. 12, is at the lowermost horizontal portion 173a of the cam slot 173 by the sliding operations of the sliding members 171 and 172, the extractor 205 is placed at a height where the lowermost tray 20 in the magazine 10 can be drawn out. When the combining protrusion 201, as shown in FIG. 13, is at the uppermost horizontal portion 173a in the cam slot 173, the extractor 205 is placed at a height where the uppermost tray 20 in the magazine 10 can be drawn out.

Referring back to FIGS. 8 and 9, a link slot 206b, into which a first protrusion 271 formed on the bottom surface of a rotating member 270 is coupled, is formed in the drawing-out link 206. The rotating member 270 is installed on the upper surface of the elevator 250, and rotates around a pivot point 270a by receiving the power of the loading motor 220 via the driving gear 267 and the connection gear 266. The connection gear 266 includes a spline peg 266a to be inserted into the splined socket 222a of the worm gear 222. The spline peg 266a disposed in the splined socket 222a can move in an axial direction. Thus, as will be described later, when the elevator 250 is lifted or lowered, the driving gear 267 and the connection gear 266 also can be elevated.

Also, a guide lever 261 for rotating around a rotation shaft 261a in engagement with a pressing portion 231a is installed on the bottom surface of the elevator 250. The guide lever 261 is elastically biased by a spring 262.

An elastic guide piece 264 has one end fixed to the bottom surface of the elevator 250 and a free end isolated from the elevator 250. The ends of an elastic wire 268 are supported on the elevating body 250 and the deck 210, respectively. As will be described later, a horizontal pressing portion 268a (see FIG. 20) for pressing against the upper surface of a disk is formed on the elastic wire 268.

Figure 14:
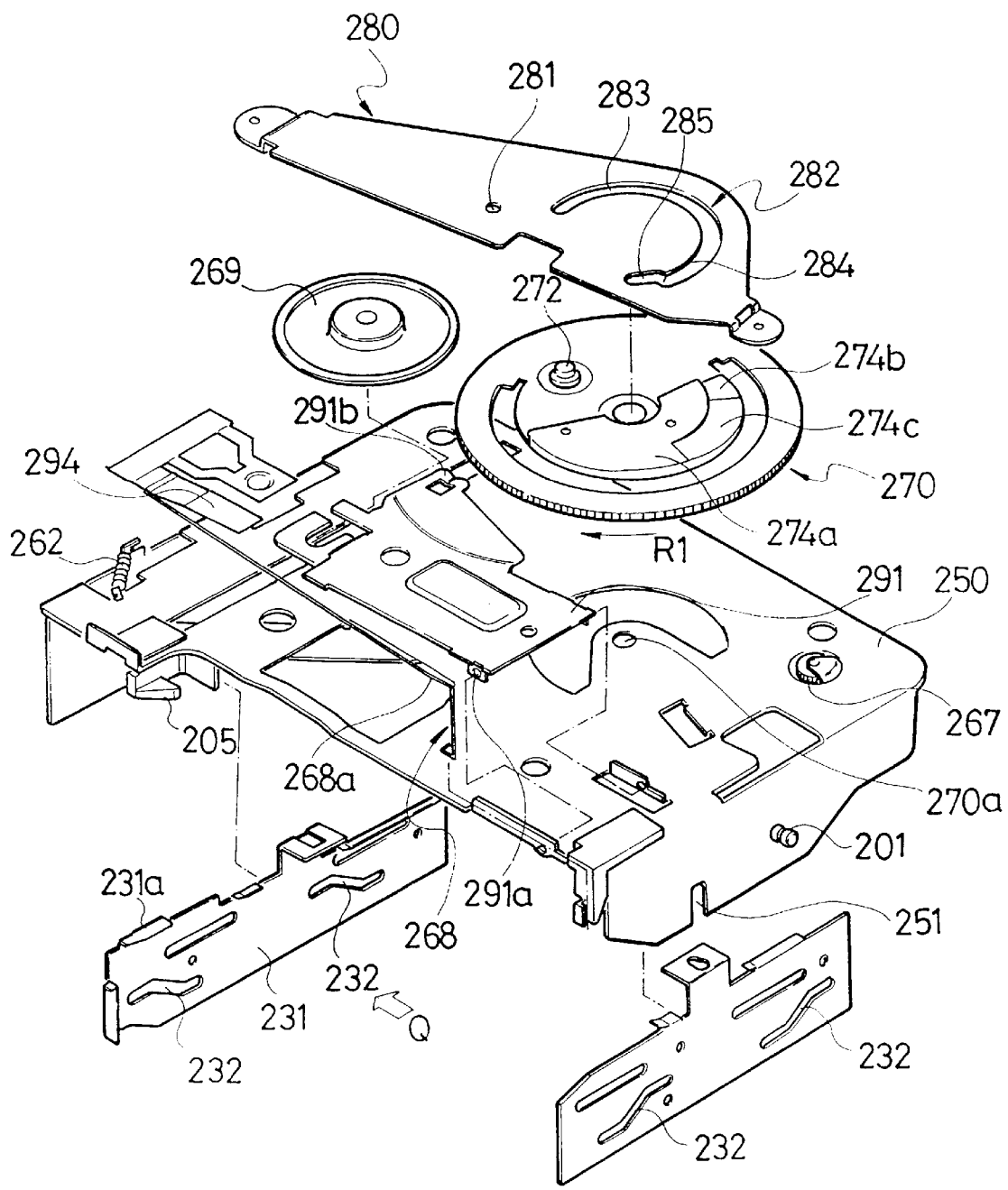
FIG. 14 is an exploded perspective view of the elevator shown in FIG. 7.
Figure 15:
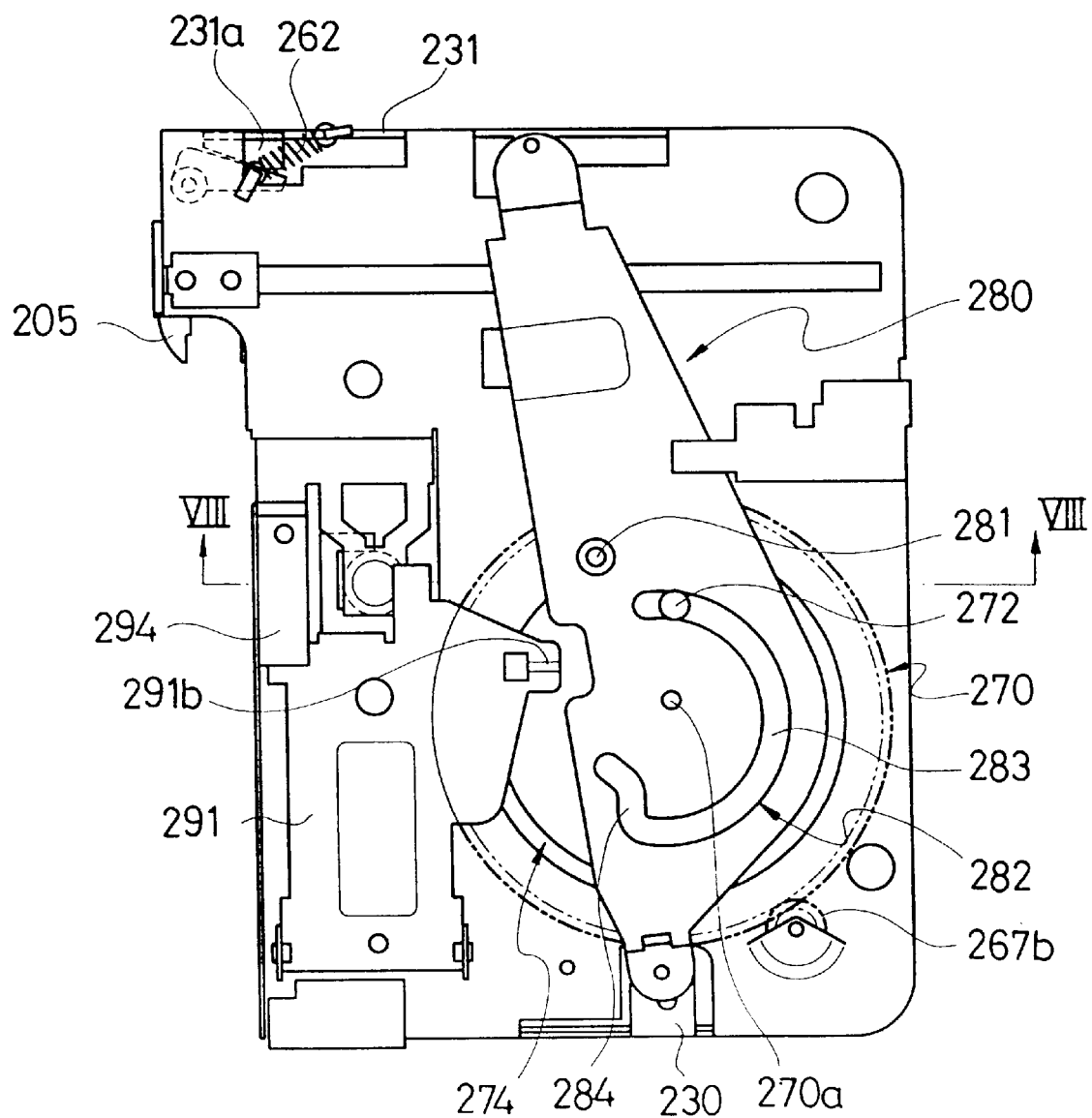
FIGS. 15 through 17 are plan views of the elevator shown in FIG. 7 for illustrating the operations of a slider and a slider link.

Meanwhile, referring to FIGS. 14 and 15, the aforementioned rotating member 270 is installed on the upper surface of the elevator 250. A slider link 280 and a pivoting plate 291 are also installed on the upper surface of the elevator 250. A first plane 274a, a second plane 274b lower than the first plane 274a, and a sloped plane 274c connecting the first and second planes 274a and 274b to each other, are formed on the upper part of the rotating member 270. Also, a second protrusion 272 is formed on the upper surface of the rotating member 270.

The slider link 280 combines with the upper surface of the elevator 250 enabling pivoting around a pivot shaft 281, and the ends thereof are hingedly combined with the sliders 231 and 232, respectively. A rotation slot 282 into which the second protrusion 272 on the rotating member 270 is to fit is formed in the slider link 280. The rotation slot 282 is comprised of an arc-shaped racing portion 283 centering around the pivot point 270a of the rotation member 270, and an operation portion 284 connected to the racing portion 283.

The pivoting plate 291 has one end coupled to the elevator 250 by a hinge 291a and a free end elastically biased downward by a leaf spring 294. A chuck 269 (see FIG. 8) is supported on the free end of the pivoting plate 291. Also, an arm portion 291b contacting the planes 274a, 274b and 274c of the rotation member 270 is provided on the free end of the rotation plate 291.

The operation of reproducing a disk 30 in the magazine 10 inserted into the main body 100 in the above-constructed disk player will now be described.

In order to reproduce the lowest disk among the plurality of disks in the magazine 10, the elevating motor 160 shown in FIG. 2 is operated. Accordingly, the power of the elevating motor 160 is transmitted to the rack member 164 via the worm 161, the worm gear 162 and the pinion 163, so that the sliding member 171 combined with the rack member 164 is moved in the direction indicated by the arrow S1. At this time, while the sliding lever 180 connected to the sliding member 171 pivots around the hinge shaft 181, the sliding lever 180 moves the sliding member 172 in a direction S2 which is opposite the moving direction of the sliding member 171. As shown in FIG. 7, the sliding members 171 and 172 move in opposite directions, so that the combining protrusions 201 of the deck assembly 200 which are inserted into the cam slots 173 of the sliding members 171 and 172 descend along the vertical slots 125 and 135. Thus, the deck assembly 200 is lowered. When the combining protrusion 201 of the deck assembly 200, as shown in FIG. 12, is at the lowest horizontal portion 173a of the cam slot 173, a stop signal is generated by the sensor 189 (see FIG. 2) to stop the operation of the elevating motor 160. Simultaneously, as shown in FIG. 9, the extractor 205 of the deck assembly 200 fits into a drawing-out locking groove 21 of the lowest tray 20 in the magazine 10.

Figure 10:
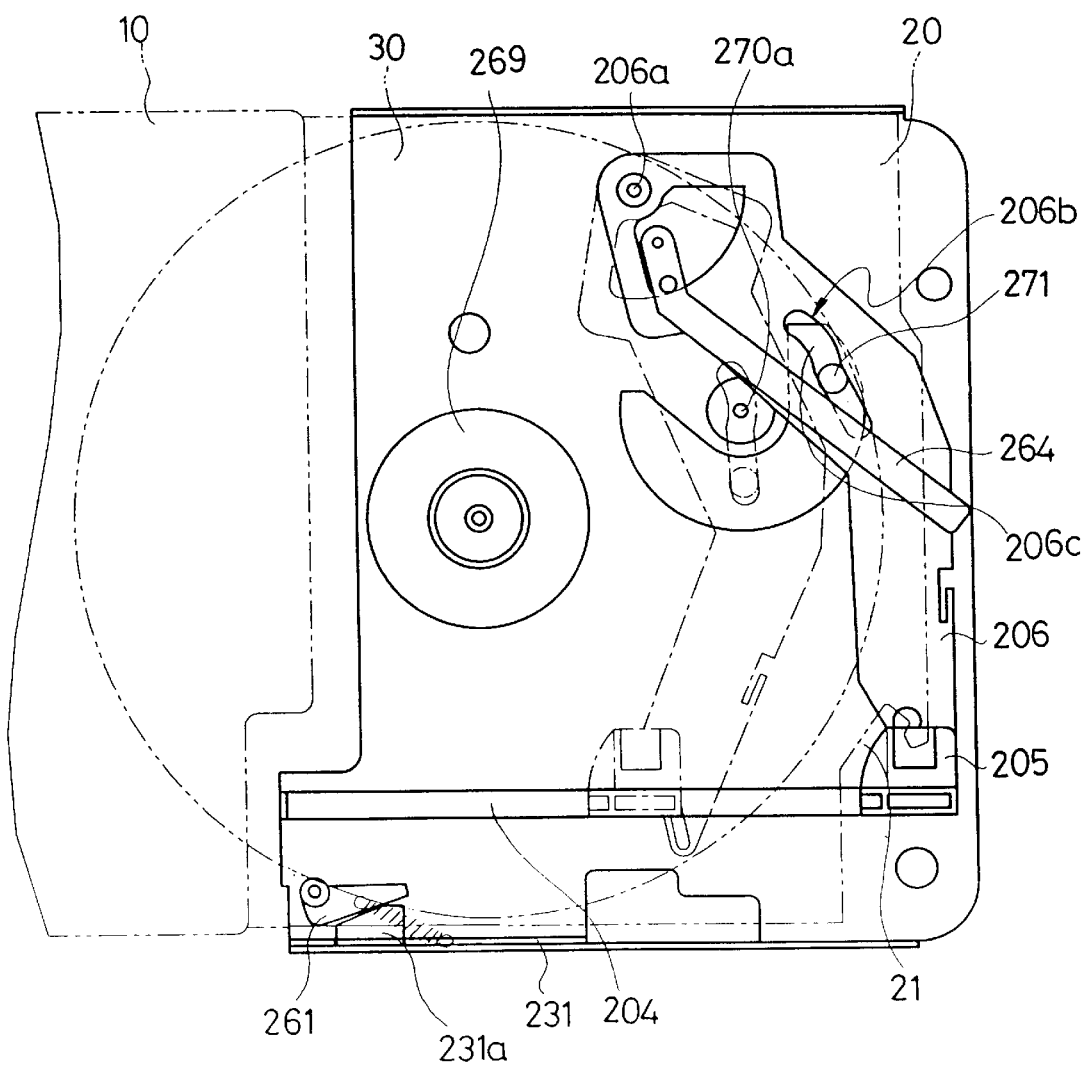

In this state, the loading motor 220 operates, so that the rotating member 270 is rotated in the direction indicated by arrow R1 by the worm 221, the worm gear 222, the connection gear 266 and the driving gear 267. When the rotating member 270 is rotated, as shown in FIG. 10, the first protrusion 271 formed on the rotating member 270 rotates the drawing-out link 206 while sliding along a link slot 206b in the drawing-out link 206. At this time, the extractor 205 fitted into the drawing-out locking groove 21 of the tray 20 extracts the tray 20 from the magazine 10 while retreating along the slot 204.

Figure 16:
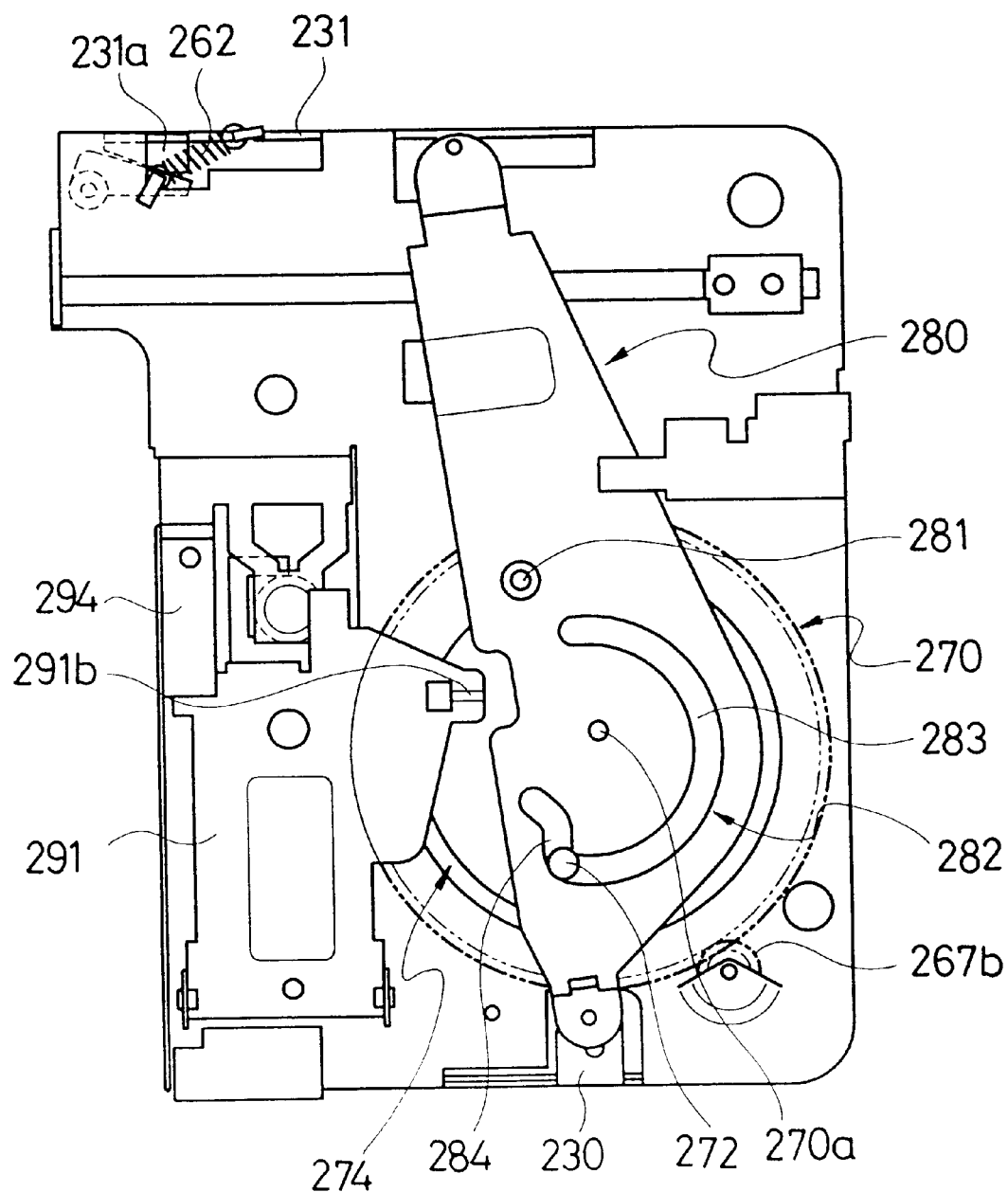

While the rotating member 270 rotates to draw out the tray 20, the second protrusion 272 of the rotating member 270 moves along the racing portion 283 of the rotation slot 282 in the slider link 280, so that the state shown in FIG. 15 changes into the state shown in FIG. 16. Thus, the slider link 280 does not rotate while the rotating member 270 rotates to draw out the disk 20.

Meanwhile, as described above, while the tray 20 is drawn out, a disk 30 (see FIG. 10) seated on the drawn-out tray 20 is prevented from popping out by the chuck 269 (see FIG. 8), the elastic guide piece 264, the guide lever 261, the elastic wire 268, etc., so that a stable state is maintained. That is, while the rotating member 270 rotates in the direction indicated by arrow R1, the arm portion 291b of the pivoting plate 291 (see FIG. 14) installed on the upper surface of the elevator 250 sequentially passes from the first plane 274a through the sloped plane 274c onto the second plane 274b of the rotating member 270 due to the elasticity of the leaf spring 294. Accordingly, the chuck 269 supported by the free end of the pivoting plate 291 gradually descends and presses the upper surface of the extracted disk 30, thereby preventing the disk 30 from leaving its position. At this time, the end of the completely extracted disk 30 is pressed by the free end of the elastic guide piece 264, so that the position of the disk 30 is stably maintained.

Also, while the tray 20 is drawn out, the guide lever 261 contacts the upper surface of the disk 30 on the tray 20 as shown in FIG. 10 to thus prevent the disk 30 from popping out upward. The extracted disk 30 is pressed by the horizontal pressing portion 268a of the elastic wire 268 as shown in FIG. 20, thereby preventing upward movement of the disk 30.

Figure 17:
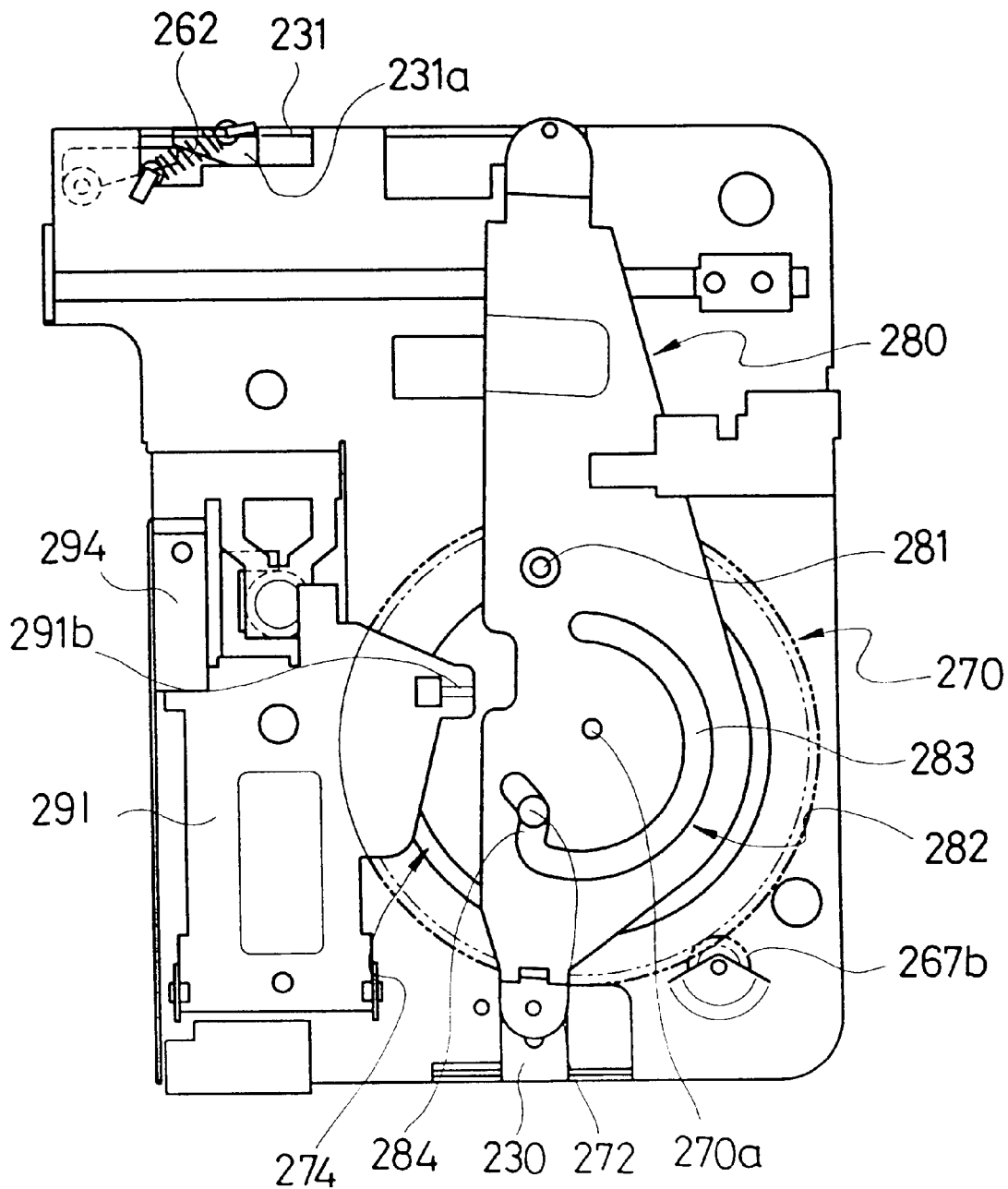
Figure 22:
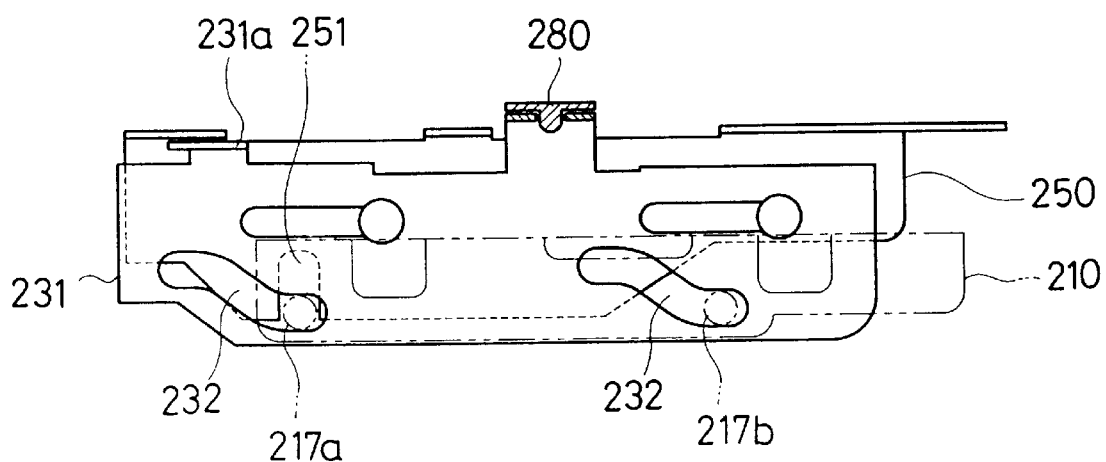
FIGS. 22 and 23 are side views of FIG. 14 viewed from the perspective of "Q".
Figure 23:
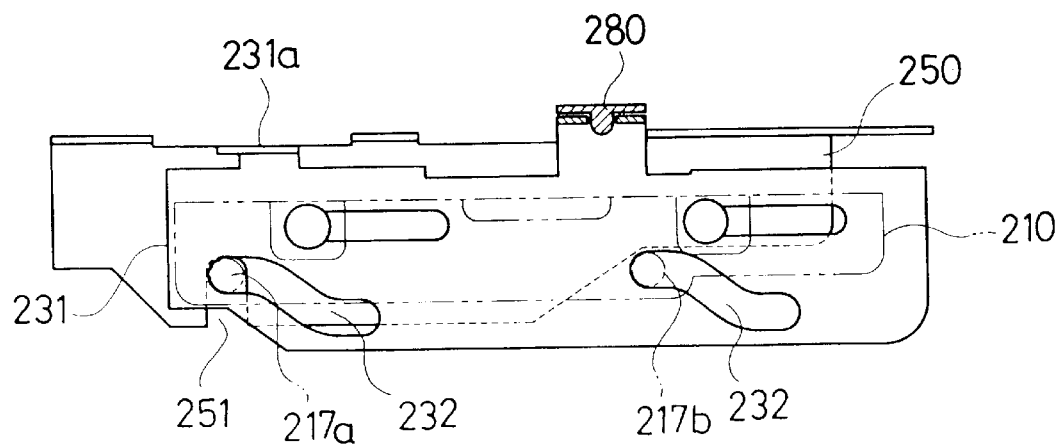

After the drawing-out of the tray 20 is completed, the loading motor 220 (see FIG. 8) continuously operates to make a continuous rotation of the rotating member 270. Thus, as shown in FIGS. 16 and 17, the second protrusion 272 of the rotating member 270 rotates the slider link 280 while sliding along the operation portion 284 of the rotation slot 282 in the slider link 280. The slider link 280 is rotated so that the sliders 230 and 231 connected to the ends of the slider link 280 slide against the elevator 250. Thus, the combining pins 217a and 217b (see FIG. 8) fit into the slanted slot 232 ascend from the state shown in FIG. 22 to the state shown in FIG. 23. Consequently, the deck 210 and the turntable 211 supported by the deck 210 ascend together to lift the disk 30 on the drawn tray 20 and adhere the lifted disk 30 to the chuck 269 as shown in FIG. 21, thereby completing the chucking of the disk 30. Simultaneously, when the deck 210 ascends, the elastic wire 268 is also deformed. Thus, the horizontal pressing portion 268a of the elastic wire 268 is separated from the upper surface of the disk 30.

Figure 11:
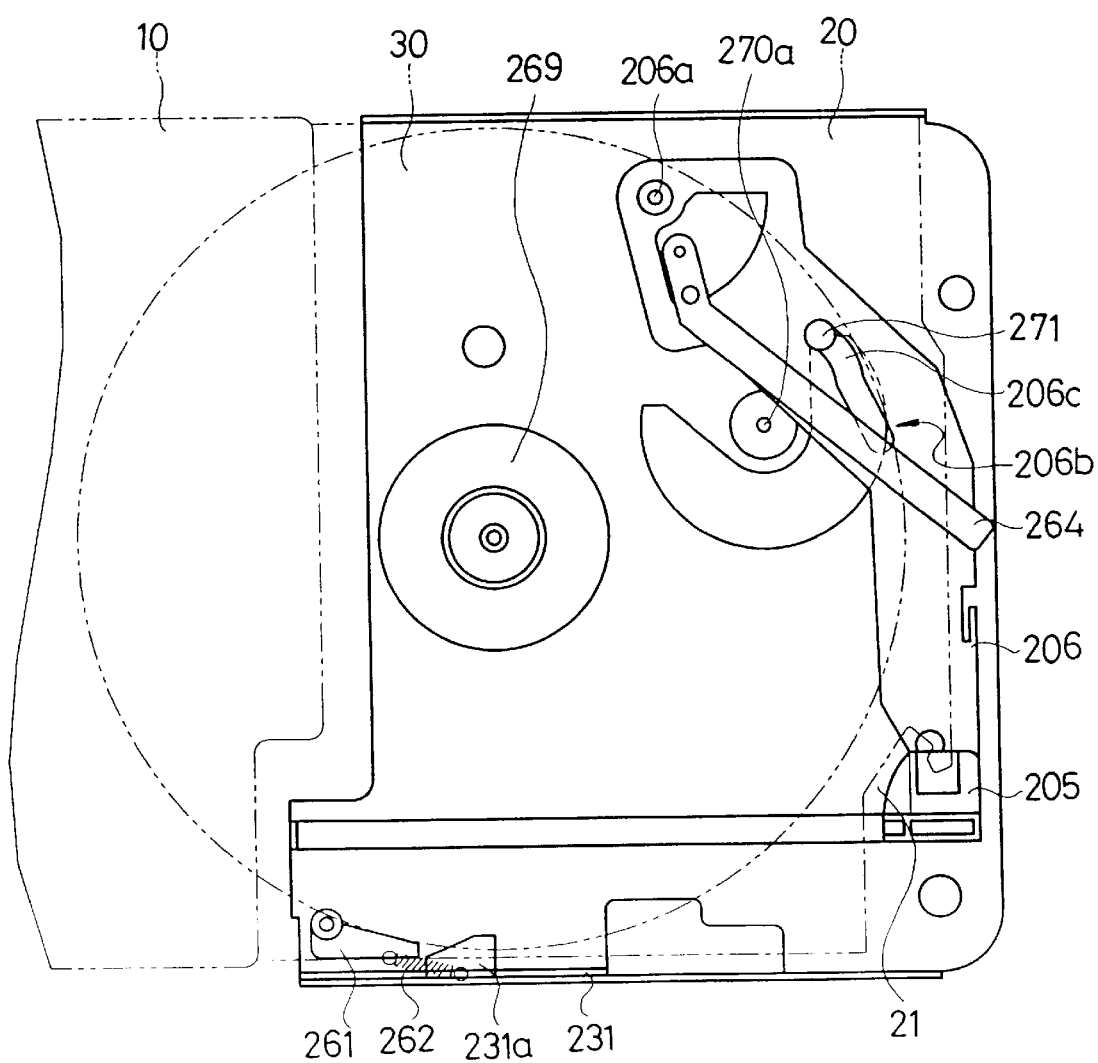

At this time, the first protrusion 271 of the rotating member 270 moves from a position shown by the solid line in FIG. 10 to a position shown in FIG. 11, along the racing portion 206c of the link slot 206b in the drawing-out link 206. The racing portion 206c forms an arc centering around the pivot point 270a of the rotating member 270, so that the drawing-out link 206 does not rotate when the rotating member 270 rotates to elevate the deck 210.

Meanwhile, when the sliders 230 and 231 slide to elevate the deck 210 as described above, the pressing portion 231a of the slider 231 having supported the guide lever 261 moves as shown in FIG. 10, so that the guide lever 261 is rotated by the restoring force of the spring 262 as shown in FIG. 11. Thus, when the turntable 211 ascends and elevates the disk 30 as described above, the disk 30 is not interfered with by the guide lever 261. Also, as shown in FIG. 19, the elastic guide piece 264, which prevents the disk 30 from leaving its position by contacting the tray 20, ascends while being pressed by the deck 210 and is separated from the upper surface of the disk 30.

As described above, when the chucking of the disk is completed, the turntable 211 and the chuck 269 are rotated by the spindle motor 213 (see FIG. 2). Also, while an optical pickup 212 is moved in a radial direction of the turntable 211 along a guide rail 216 by an optical pickup driving motor 214, it reproduces information recorded on a disk.

In order to exchange disks, the loading motor 220 of FIG. 8 rotates the rotating member 270 of FIG. 9 in a reverse direction. Accordingly, the deck 210 is lowered through a process opposite to the above-described process, so that the chucked disk 30 is placed on the tray 20 drawn out from the magazine 10. Thereafter, when the drawing-out link 206 rotates in a reverse direction, the tray 20 is inserted back into the magazine 10 by the extractor 205. In this state, the operation of the loading motor 220 is paused, and the elevating motor 160 is operated to move the deck assembly 200 to a desired height, that is, a height where the extractor 205 can draw a selected disk in the magazine 10. Then, the newly selected disk is drawn from the magazine 10 by the above-described disk loading operation, and reproduced.

As described above, in the disk player according to the present invention, the operations of drawing out a tray from a magazine and chucking a disk on the drawn tray are sequentially performed by a loading motor. Thus, in contrast to a conventional disk player having a complicated structure by separately including a driving source for drawing out the tray and a driving source for chucking a disk, the disk player according to the present invention has a simple structure. Therefore, the manufacturing cost thereof can be reduced.

It is contemplated that numerous modifications may be made to the disk player of the present invention without departing from the spirit and scope of the invention as defined in the following claims.

What is claimed is:

1. A disk player comprising:

a frame constituting a main body of said disk player;

a magazine for stacking a plurality of trays, each tray holding a disk thereon, and which is operative to be inserted into and ejected from said frame;

a chuck mounted to said frame, for pressing an upper surface of a selected disk drawn out from said magazine;

a turntable mounted to said frame and enabling up and down movement, together with said chuck for chucking said selected disk, which is drawn out, when ascending;

an extractor mounted to said frame and enabling forward, backward, upward and downward movement with respect to said magazine, for selectively combining with a selected tray among the plurality of trays in said magazine and drawing out said selected tray between said turntable and said chuck;

an elevating mechanism which elevates said extractor;

a loading motor installed on said frame; and a disk loading mechanism which operates by receiving power from said loading motor and which advances or retreats said extractor to draw out said selected tray from said magazines and lifts or lowers said turntable to chuck said selected disk drawn out between said turntable and said chuck.

2. The disk player as claimed in claim 1, wherein said elevating mechanism comprises:

an elevating motor installed on said frame;

an elevator, which supports said extractor, mounted to said frame and enabling lifting or lowering, and having ends on which combining protrusions are formed; and a pair of sliding members which are installed on respective sides of said elevator enabling sliding in opposite directions to each other by said elevating motor, and which have cam slots with a plurality of horizontal portions formed at different heights and sloped portions formed between said horizontal portions, said combining protrusions respectively combining with said cam slots.

3. The disk player as claimed in claim 2, wherein said frame has vertical slots, into which said combining protrusions which have passed through said cam slots respectively fit, formed therein.

4. The disk player as claimed in claim 2, wherein said disk loading mechanism comprises:

a pair of sliders slidably installed on respective sides of said elevator;

a slider link, which is rotatably installed on said elevator and has ends hingedly combined with said sliders, respectively, for sliding said sliders in opposite directions by a rotation of said slider link;

a drawing-out link rotatably installed on said elevator, for combining with said extractor and advancing and retreating said extractor with respect to said magazine by a rotation of said drawing-out link;

a deck on which said turntable is installed, ascending and descending with respect to said elevator in engagement with said sliders; and a rotating member installed on said elevator and enabling rotation by said loading motor, for sequentially rotating said drawing-out link and said slider link.

5. The disk player as claimed in claim 2, wherein said cam slots are formed at a slant in opposite directions in said respective sliding members such that said elevator moves up or down as said sliding members move in opposite directions.

6. The disk player as claimed in claim 1, wherein said disk loading mechanism comprises:

an elevator installed in said frame and enabling lifting or lowering, and installed so that said extractor is operative to move forward or backward with respect to said magazine;

a pair of sliders slidably installed on respective sides of said elevator;

a slider link, which is rotatably installed on said elevator and has both ends hingedly combined with said sliders, respectively, for sliding said sliders in opposite directions by a rotation of said slider link;

a drawing-out link rotatably installed on said elevator, for combining with said extractor and advancing and retreating said extractor with respect to said magazine by a rotation of said drawing-out link;

a deck on which said turntable is installed, ascending and descending with respect to said elevator in engagement with said sliders; and a rotating member installed on said elevator and enabling rotation by said loading motor, for sequentially rotating said drawing-out link and said slider link.

7. The disk player as claimed in claim 6, wherein said rotating member has first and second protrusions, a link slot with which said first protrusion is combined is formed in said drawing-out link, and a rotation slot with which said second protrusion is combined is formed in said slider link, such that when said first protrusion is moved along said link slot by the rotation of said rotating member, said drawing-out link rotates but said slider link does not rotate, and when said second protrusion moves along said rotation slot, said slider link rotates but said drawing-out link does not rotate.

8. The disk player as claimed in claim 6, further comprising a chuck elevating mechanism which lowers said chuck so that said chuck can press the upper surface of the selected disk which is drawn out as said selected tray is drawn out from said magazine.

9. The disk player as claimed in claim 8, wherein said chuck elevating mechanism comprises:

a pivoting plate having one end supporting said chuck and the other end hingedly combined with said elevator;

a spring for elastically biasing said pivoting plate so that said chuck can press down on the selected disk which is drawn out; and a plurality of planes formed at different heights on an upper surface of said rotating member enabling contact with said pivoting plate, wherein while said rotating member rotates to draw out said selected tray, said pivoting plate moves down along said plurality of planes so that said chuck presses down on the upper surface of said selected disk which is drawn out.

10. The disk player as claimed in claim 6, further comprising a disk departure preventing mechanism which prevents the selected disk seated on said selected tray, which is drawn out, from leaving its position.

11. The disk player as claimed in claim 10, wherein said disk departure preventing mechanism comprises:

a guide lever engaged with at least one of said sliders, for making a rotation so that said guide lever can contact the upper surface of said selected disk when said deck is lowered with respect to said elevator, and said guide lever is operative to be separated from said upper surface of said selected disk when said deck is lifted with respect to said elevator; and a spring for elastically biasing said guide lever in a direction in which said guide lever is separated from the upper surface of said selected disk.

12. The disk player as claimed in claim 11, further comprising a pressing portion formed on the at least one of said sliders to rotate said guide lever when said sliders slide.

13. The disk player as claimed in claim 10, wherein said disk departure preventing mechanism comprises an elastic wire having one end fixed to said elevator and another end fixed to said deck, and a horizontal pressing portion, for pressing down on the upper surface of said selected disk, formed on said elastic wire.

* * * * *